US007234498B2

(12) United States Patent
Agostini

(10) Patent No.: US 7,234,498 B2
(45) Date of Patent: Jun. 26, 2007

(54) SELF-LUMINESCENT PNEUMATIC TIRE

(75) Inventor: Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 216 days.

(21) Appl. No.: 10/818,732

(22) Filed: Apr. 6, 2004

(65) Prior Publication Data

US 2005/0217782 A1    Oct. 6, 2005

(51) Int. Cl.
*B60C 1/00*    (2006.01)
*B60C 13/00*    (2006.01)

(52) U.S. Cl. .................... 152/450; 152/209.1; 152/525

(58) Field of Classification Search ................ 152/524, 152/525; 250/462.1; 252/646
See application file for complete search history.

(56) References Cited

U.S. PATENT DOCUMENTS

| 2,749,251 | A | | 6/1956 | Shapiro ................ 117/33.5 |
| 3,033,797 | A | | 5/1962 | DeLeo et al. ............ 252/301.1 |
| 3,147,243 | A | * | 9/1964 | Brindell et al. ............ 526/159 |
| 3,210,288 | A | | 10/1965 | Evans et al. ............. 252/301.1 |
| 3,224,978 | A | | 12/1965 | MacHutchin et al. .... 252/301.1 |
| 3,238,139 | A | | 3/1966 | Fischer et al. ........... 252/301.1 |
| 3,325,420 | A | | 6/1967 | Futterknecht et al. .... 252/301.1 |
| 3,342,743 | A | | 9/1967 | Rosenberg ............... 252/301.1 |
| 3,607,498 | A | | 9/1971 | Kubota ........................ 156/116 |
| 4,020,203 | A | | 4/1977 | Thuler .......................... 428/35 |
| 4,546,417 | A | | 10/1985 | Watts ........................... 362/84 |
| 4,677,008 | A | | 6/1987 | Webb ........................... 428/35 |
| 4,889,660 | A | | 12/1989 | Jensen et al. ................ 252/646 |
| 4,997,597 | A | | 3/1991 | Clough et al. ............... 252/646 |
| 5,533,807 | A | | 7/1996 | Bamji et al. .................. 374/45 |
| 6,207,077 | B1 | | 3/2001 | Burnell-Jones ........ 252/301.36 |
| 6,344,286 | B1 | | 2/2002 | Kim et al. ................... 428/690 |
| 6,361,887 | B1 | | 3/2002 | Shi et al. ..................... 428/690 |
| 6,362,310 | B1 | | 3/2002 | Woo et al. ................... 528/397 |
| 6,368,732 | B1 | | 4/2002 | Jin et al. ...................... 428/690 |
| 6,431,236 | B1 | | 8/2002 | Kanenari et al. ........... 152/450 |
| 6,676,852 | B2 | | 1/2004 | Brown et al. .......... 252/301.36 |
| 7,001,051 | B2 | * | 2/2006 | Palmer et al. ............... 362/473 |

FOREIGN PATENT DOCUMENTS

GB    2331052 A  *  5/1999

OTHER PUBLICATIONS

Patent Abstract of Japan—Applicant: Terumasa—Publication No. 04-202339—Publication Date: Jul. 23, 1992.
Patent Abstract of Japan—Applicant: Toshikatsu—Publication No. 59-020703—Publication Date: Feb. 2, 1984.

* cited by examiner

*Primary Examiner*—Geoffrey L. Knable
(74) *Attorney, Agent, or Firm*—John D. DeLong

(57) ABSTRACT

The present invention relates to a pneumatic tire having a component comprising at least one elastomer containing olefinic unsaturation; a radioactive source of radiation; and a phosphorescent agent capable of emitting visible light upon exposure to said radiation.

8 Claims, No Drawings

SELF-LUMINESCENT PNEUMATIC TIRE

FIELD OF THE INVENTION

The present invention relates to a self-luminescent pneumatic tire.

BACKGROUND OF THE INVENTION

The use of phosphorescent materials in pneumatic tires has been proposed, for example, to increase visibility of tires at night and to provide for customized tires with desirable colorful, bright markings. However, prior methods to provide such tires have required illumination of the tires with external light sources, such as sunlight. Such resort to external light sources results in depletion of the phosphorescent effect once the tire is removed from the light source. It would, therefore, be useful to have a phosphorescent pneumatic tire wherein the phosphorescent effect is self-generating within the tire, with no need for an external light or energy source.

SUMMARY OF THE INVENTION

The present invention relates to a pneumatic tire having a component comprising at least one elastomer containing olefinic unsaturation; a radioactive source of radiation; and a phosphorescent agent capable of emitting visible light upon exposure to said radiation.

DETAILED DESCRIPTION OF THE INVENTION

The present invention relates to a pneumatic tire having a component comprising at least one elastomer containing olefinic unsaturation; a radioactive source of radiation; and a phosphorescent agent capable of emitting visible light upon exposure to said radiation.

The component of the self-luminescent pneumatic tire includes vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In another embodiment, the rubber composition may include a rubber or elastomer containing olefinic unsaturation and an additional functional group reactive with the sulfur containing organosilicon compounds of Formula I described later. Representative functional groups include halogens, such as Cl and Br; alkoxy groups, such as methoxy groups; and pseudohalogens, such as—SCN.

In another embodiment, the elastomer containing olefinic unsaturation may be a siloxy-terminated polymer, such as siloxy-terminated styrene-butadiene copolymer, siloxy-terminated isoprene-butadiene copolymer and siloxy-terminated styrene-isoprene-butadiene terpolymer.

In one aspect the rubber may be of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization-derived styrene/butadiene rubbers, cis 1,4-polybutadiene rubbers and emulsion polymerization prepared butadiene/acrylonitrile copolymers.

In one embodiment, an emulsion polymerization-derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of a tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

According to this invention, it is believed to be a very substantial departure from past practice, for tires, to utilize a self-phosphorescent compound to provide a phosphorescent effect in a tire component. The compound is self-phosphorescent, or self-luminescent, because no external source of light is require to excite the phosphorescent agent. Instead, the source of excitation is contained within the rubber composition used to fabricate the component.

To provide the source of electromagnetic energy required to excite the phosphorescent agent, a radioactive source of radiation is used. The radioactive source of radiation may be any suitable radioactive compound including, for example, tritiated compounds and carbon-14 labeled compounds.

In one embodiment, the radioactive source of radiation is a tritiated agent. Suitable tritiated agents include tritiated versions of any compounds suitable for use in a rubber compound. For example, suitable tritiated agents include any selected from the group consisting of tritiated process oils, tritiated fatty acids, tritiated alcohols, tritiated elastomers, particulate tritiated thermoplastics, tritiated organic fillers, and tritiated waxes.

Tritiated elastomers may be produced by polymerization of tritiated monomers, or by post-polymerization tritiation of the elastomer. For example, tritiated styrene-butadiene rubber may be produced by polymerization of butadiene and tritiated styrene, wherein the styrene is tritiated at one or more positions on the aromatic ring. The polymerization of butadiene and styrene then follows the typical emulsion or solution polymerization techniques as are known in the art, for example, by organo lithium catalyzation in the presence of an organic hydrocarbon solvent. Other tritiated elastomers including but not limited to tritiated polybutadiene, tritiated polyisoprene, and tritiated EPDM may be produced similarly with suitable process conditions. Alternatively, the tritiated polymer may be produced by post polymerization tritiation, following techniques known in the art for hydrogenation of elastomers. For example, the elastomer may be tritiated with $LiAlH^{*}_{4}$ in the presence of a metal catalyst, where H* represents the tritium atom. Alternatively, the elastomer may be tritiated by exposure to a tritiated gas as disclosed in U.S. Pat. Nos. 3,238,139 and 4,889,660. Preferably, the tritiated polymer has most or all of the tritium substituted on the appended functional groups and not in the polymer backbone.

Suitable tritiated elastomers include tritiated forms of any of the elastomers typically used in tires as previously described herein. Suitable tritiated elastomers may be selected from the group consisting of tritiated natural rubber, tritiated neoprene, tritiated polyisoprene, tritiated butyl rubber, tritiated polybutadiene, tritiated styrene-butadiene copolymer, tritiated styrene/isoprene/butadiene rubber, tritiated methyl methacrylate-butadiene copolymer, tritiated isoprene-styrene copolymer, tritiated methyl methacrylate-isoprene copolymer, tritiated acrylonitrile-isoprene copolymer, tritiated acrylonitrile-butadiene copolymer, tritiated ethylene propylene diene rubber (EPDM) and mixtures thereof. In one embodiment, tritiated ethylene propylene diene rubber (EPDM) or tritiated polybutadiene are used.

Fatty acids such as stearic acid are well known compounding ingredients in rubber compounds. Tritiated fatty acids and alcohols may be used to provide the source of radiation in the luminescent tire. Suitable tritiated fatty acids and alcohols include those selected from the group consisting of tritiated alcohols and paraffinic carboxylic acids having chain lengths of 12-20 carbon atoms. For example, hexadecanol, octadecanol, hexadecanoic acid (palmitic acid), and octadecanoic acid (stearic acid) may be produced by treatment with a mixture of hydrogen and tritium gas of the respective unsaturated compounds, i.e., hexadecenol, octadecenol, hexadecenoic acid, and octadecenoic acid, respectively, following the teachings of U.S. Pat. No. 2,749,251.

In another embodiment, the radioactive source of radiation may include a carbon 14 labeled compound. In one embodiment, carbon 14 labeled calcium carbonate may be used.

The rubber composition may include from about 1 to about 100 phr of radioactive source. The amount of radioactive source used in the rubber composition depends on the relative amount of radioactive label such as tritium or carbon 14 present in the source, the emitting efficiency of the phosphor used, and the desired intensity of the emitted light.

The rubber composition includes a phosphorescent agent capable of emitting visible light upon exposure to the radiation emitted by the radiation source. Suitable phosphorescent agents include zinc sulfide phosphors and metal aluminate oxide phosphors. Preferred zinc sulfide phosphors may optionally include selenium and silicon. The zinc sulfide phosphors are preferably activated by copper and, more preferably, additionally activated by a metal element or plurality of metals selected from the group consisting of aluminum, silver, gold, magnesium, manganese, gallium, indium, scandium, iron, calcium and/or lead, by a rare earth or rare earth elements such as cerium, terbium, europium, gadolinium, samarium and/or praseodymium, by halogens, by silicon and/or selenium and by mixtures these elements, particularly by mixtures of metals and rare earths with or without silicon and selenium. Zinc calcium sulfide phosphors and mixtures of zinc sulfide phosphor with calcium sulfide phosphor are also preferred. Preferred metal aluminate oxide phosphors are alkaline earth metal aluminate oxide phosphors such as strontium aluminum oxide, calcium aluminum oxide, barium aluminum oxide or mixtures thereof, preferably activated with europium and co-activated with an element such as lanthanum, cerium, praseodymium, neodymium, samarium, gadolinium, dysprosium, holmium, erbium, thulium, ytterbium, lutetium, the metals tin and/or bismuth or mixtures thereof. The preferred alkaline earth metal aluminate oxides may optionally additionally contain magnesium aluminum oxide. Examples of suitable phosphorescent pigments include multiply activated zinc sulfide such as LUMILUX® ZnS:Cu, available from Hoechst or AlliedSignal of Australia, UMC Phosphorescent pigments (zinc sulfide and mixtures with other sulfides), available from United Mineral & Chemical Corp., USA, rare-earth activated alkaline earth aluminate oxides such as LUMI-LUX® Green-SN long afterglowing pigments available from AlliedSignal of Australia, and LUMINOVA® strontium aluminate oxide pigments available from United Mineral and Chemical Corp., USA, and mixtures of these phosphors.

In another embodiment, the phosphorescent agent is selected from the group consisting of selected from the group consisting of (a) $SrAl_2O_4$:Eu, Dy, (b) $Sr_4Al_{14}O_{25}$:Eu, Dy, (c) $CaAl_2O_4$:Eu, Nd, (d) $SrAl_2O_4$:Eu and (e) $m(Sr_{1-x}Eu_x)O.nAl_2O_3.yB_2O_3$, wherein $1 \leq m \leq 5$, $1 \leq n \leq 8$, $0.001 \leq x \leq 0.1$, $0.005 \leq y \leq 0.35$, having an average particle size of 1 to 100 μm.

Other suitable phosphorescent agents include organic scintillation dyes as disclosed in U.S. Pat. No. 4,997,597.

In another embodiment, the phosphorescent agent is an organic phosphor selected from the group consisting of 9,10-diphenylanthracene; 4-fluoranthene; phenyl-oxazole-phenyl-oxazole-phenyl; trans-stilbene; alpha-naphthylphenyloxazole; and 2-phenyl-5-(4-biphenylyl)-1,3,4-oxadiazole.

The amount of phosphorescent agent in the rubber composition may range from 1 to 100 phr. The amount of phosphorescent agent used in the rubber composition generally depends on the light emitting efficiency of the phosphor in the presence of the radiation source, and on the desired intensity of the emitted light.

In one embodiment, the radiation source and the phosphorescent agent may be premixed to form a composite, as for example in U.S. Pat. No. 2,749,251. For example, a zinc sulfate phosphor may be coated with a tritiated elastomer, tritiated stearic acid, or tritiated wax to obtain phosphor/radiation source composite. The composite may offer the advantage of a more efficient phosphorescent effect due to the proximity of the radiation source to the phosphorescent agent.

The commonly-employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. In one embodiment, the silica is a synthetic amorphous precipitated silica having a BET surface area in a range of about 140 to about 180 m2/g. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

In addition to silica, the rubber composition may contain other fillers. Representative fillers include carbon black, aluminosilicates, clays, zeolites, modified starches, carbon black/silica composites and the like. Such fillers may be present in an amount ranging from 10 to 150 phr. If carbon black is used, the amount of carbon black may vary. Generally speaking, the amount of carbon black will vary from 0 to 80 phr. Preferably, the amount of carbon black will range from 0 to 40 phr. It is to be appreciated that a silica coupler may be used (described later) in conjunction with a carbon black, namely pre-mixed with a carbon black prior to addition to the rubber composition, and such carbon black is to be included in the aforesaid amount of carbon black for the rubber composition formulation.

The rubber composition may be used with a silica-coupling agent. Example of suitable coupling agents includes sulfur containing organosilicon compounds. Examples of suitable sulfur containing organosilicon compounds are of the formula:

in which Z is selected from the group consisting of

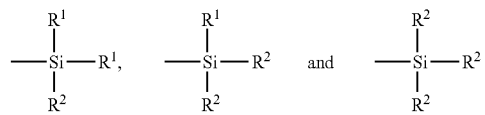

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl) tetrasulfide, 3,3'-bis(triethoxysilylpropyl)octasulfide, 3,3'-bis(trimethoxysilylpropyl) tetrasulfide, 2,2'-bis(triethoxysilylethyl)tetrasulfide, 3,3'-bis(trimethoxysilylpropyl) trisulfide, 3,3'-bis(triethoxysilylpropyl)trisulfide, 3,3'-bis(tributoxysilylpropyl) disulfide, 3,3'-bis(trimethoxysilylpropyl)hexasulfide, 3,3'-bis(trimethoxysilylpropyl) octasulfide, 3,3'-bis(trioctoxysilylpropyl)tetrasulfide, 3,3'-bis(trihexoxysilylpropyl) disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl) pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl) tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene) tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)tetrasulfide and 3,3'-bis(triethoxysilylpropyl)disulfide. Preferably Z is

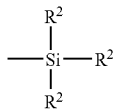

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 4.

The amount of the above sulfur containing organosilicon compound in a rubber composition will vary depending on the level of silica that is used. Generally speaking, the amount of the compound of Formula I will range from 0 to 1.0 parts by weight per part by weight of the silica. Preferably, the amount will range from 0 to 0.4 parts by weight per part by weight of the silica.

It is readily understood by those having skill in the art that the rubber composition may contain conventional additives generally known in the rubber compounding art such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344-346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

In some cases, the use of sulfur as a curative is not desired as the sulfur may interfere with the phosphorescent agent, as with alkaline earth metal aluminate phosphors. In one embodiment, a free radical crosslinking reaction may be used to cure the rubber composition. The reaction may be via UV cure system or peroxide cure system. Well-known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy)cyclohexane, 1,1-di(t-amylperoxy) cyclohexane, ethyl-3,3-di(t-butylperoxy)butyrate, ethyl-3,3-di(t-amylperoxy)butyrate, 2,5-dimethyl-2,5-di(t-butylperoxy)hexane, t-butyl cumyl peroxide, .alpha., .alpha.'-bis(t-butylperoxy)diisopropylbenzene, di-t-butyl peroxide, 2,5-dimethyl-2,5-di(t-butylperoxy)hexyne-3, t-butyl perbenzoate, 4-methyl-4-t-butylperoxy-2-pentanone and mixtures thereof. Typical amounts of peroxide ranges from 1 to 12 phr (based on active parts of peroxide). Preferably, the amount of peroxide ranges from 2 to 6 phr.

A co-agent may be present during the free radical crosslinking reaction. Co-agents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof.

The co-agent may be present in a range of levels. Generally speaking, the co-agent is present in an amount ranging from 0.1 to 40 phr. Preferably, the co-agent is present in an amount ranging from 2 to 15 phr.

The mixing of the rubber composition can be accomplished by methods known to those having skill in the rubber mixing art. For example, the ingredients are typically mixed in at least two stages, namely at least one non-productive stage followed by a productive mix stage. In accordance with a preferred embodiment, the high reinforcing grade silica is initially mixed with the rubber, for example, in a first non-productive followed by the addition of the low reinforcing grade silica such as being mixed with the product of the first non-productive in a second non-productive mixing stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The rubber, two silicas, silica coupler and carbon black, if used, are mixed in one or more non-productive mix stages. The terms "non-productive" and "productive" mix stages are well known to those having skill in the rubber mixing art. The rubber composition containing the rubber and two silicas should, as well as the sulfur-containing organosilicon compound, if used, be subjected to a thermomechanical-mixing step. The thermomechanical-mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization, the phosphorescent rubber composition can be used for various components in a tire. For example, the phosphorescent rubber composition may be in the form of a tire tread or sidewall component, such as a sidewall stripe or indicial marking. Such tire components and tires can be built, shaped, molded and cured by various methods which are known and will be readily apparent to those having skill in such art. Preferably, the rubber composition is used in the tread or sidewall of a tire. In the case of a sidewall component, the component may be extruded as part of the sidewall, or separately molded and applied to the sidewall before curing, as is known in the art. A sidewall stripe or indicial marking such as a logo, lettering or the like may have a thickness in a range of from about 0.1 to about 3 millimeters (mm). As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a component comprising:
    at least one elastomer containing olefinic unsaturation;
    a radioactive source of radiation comprising tritiated paraffinic carboxylic acids having chain lengths of 12-20 carbon atoms; and
    a phosphorescent agent selected from the group consisting of phenyl-oxazole-phenyl-oxazole-phenyl; trans-stilbene; alpha-naphthylphenyloxazole; and 2-phenyl-5-(4-biphenylyl)-1,3,4-oxadiazole;
wherein the radioactive source and the phosphorescent agent are premixed to form a composite.

2. The pneumatic tire of claim 1, wherein said elastomer containing olefinic unsaturation is selected from the group consisting of natural rubber, neoprene, polyisoprene, butyl rubber, polybutadiene, styrene-butadiene copolymer, styrene/isoprene/ butadiene rubber, methyl methacrylate-butadiene copolymer, isoprene-styrene copolymer, methyl methacrylate-isoprene copolymer, acrylonitrile-isoprene copolymer, acrylomtrile-butadiene copolymer, EPDM and mixtures thereof.

3. The pneumatic tire of claim 1, wherein said radioactive source is tritiated stearic acid.

4. The pneumatic tire of claim 1, wherein said component further comprises precipitated silica.

5. The pneumatic tire of claim 1, wherein said component further comprises a sulfur-containing organosilicon compound.

6. The pneumatic tire of claim 1, wherein said component is peroxide cured.

7. The pneumatic tire of claim 1, wherein said component is selected from the group consisting of a sidewall components and tread components.

8. The pneumatic tire of claim 1, wherein the component is an extruded sidewall component having a thickness ranging from about 0.1 to about 3 mm.

* * * * *